United States Patent [19]

PreJean

[11] Patent Number: 5,333,927
[45] Date of Patent: Aug. 2, 1994

[54] SUN SHIELD FOR A WINDSHIELD

[76] Inventor: Ronald M. PreJean, 6911 Topanga Canyon #101, Canoga Park, Calif. 91303

[21] Appl. No.: 148,194

[22] Filed: Nov. 3, 1993

[51] Int. Cl.⁵ .................................................. B60J 3/00
[52] U.S. Cl. .................... 296/97.7; 296/97.9; 160/370.2 R
[58] Field of Search .............. 296/97.7, 97.1, 97.5, 296/97.6, 97.8, 97.9; 160/370.2, DIG. 3; 224/312

[56] References Cited
U.S. PATENT DOCUMENTS

| | | | |
|---|---|---|---|
| 2,549,395 | 4/1951 | Short, Sr. .................. | 296/97.9 X |
| 2,620,222 | 12/1952 | Beauchamp ................ | 296/97 |
| 2,922,676 | 1/1960 | Czajkowski ................ | 296/97.8 |
| 4,172,613 | 10/1979 | Furando .................... | 296/97.7 |
| 4,958,879 | 9/1990 | Gillum ...................... | 296/97.9 X |

Primary Examiner—Joseph D. Pape

[57] ABSTRACT

A multifunctional sun shielding device for use in automobiles and other vehicles is described. It is a flat flexible and resilient lightweight plate having a surface which may be placed against the vehicle's windshield to block the suns rays. The device is thick enough to contain a pocket for holding accessories and is held in place by either wedging between the windshield and the rear view mirror, or by a separate suction device.

6 Claims, 2 Drawing Sheets

SUN SHIELD FOR A WINDSHIELD

FIELD OF THE INVENTION

This invention relates generally to sun shield devices, and, more particularly, is directed towards an auxiliary sun shield device for use proximate to existing rear view mirrors in vehicles.

BACKGROUND OF THE INVENTION

The current application is a substitute application for U.S. application Ser. No. 07/838,491, which is hereby explicitly abandoned.

Conventional automotive sun visors are typically mounted near the top portion of a windshield directly in front of both the driver and passenger seat in the passenger compartment. Such visors are pivoted so as to be positioned in an upward position near or up against the roof of the compartment, or so as to be positioned in a downward shielding position for shielding sunlight or other glare from a driver's or passenger's eyes.

Such visors are of a shape and length so as not to interfere with a rear view mirror that is typically situated between the visors in the approximate center of the windshield. As such, conventional visors leave a considerable space open above and around the rear view mirror, through which sun and other glare often passes, rendering the conventional visors essentially useless.

U.S. Pat. No. 2,620,222 to Beauchamp on Dec. 2, 1952, teaches a sun visor device for attachment to or near a rear view mirror assembly for blocking or reducing light from entering the vehicle around the periphery of the rear view mirror. Such a device, while well-suited for blocking such light has several considerable drawbacks which explain its scant acceptance in the marketplace. Such a device is relatively complicated to manufacture, and consists of several separate pieces that must be assembled. As such, this type of device is relatively expensive. Further, such a device has a metal clip for attaching to a centerpost of the windshield. Such centerposts are no longer widely used in vehicles, and therefore this type of attaching means is not useful in most modern day vehicles.

Clearly, then, there is a need for a sun shade device for spanning the distance between the ends of the conventional vehicle visors, and that is easily attached to a wide variety of vehicle mirror assemblies or windshields. Such a needed device would not interfere with the use of the rear view mirror, and in fact would facilitate the use of the rear view mirror by preventing surrounding glare and sunlight from interfering with its use. Further, such a needed device could be made with various pockets for retaining sunglasses, writing implements, or the like. Still further, such a needed device would have an attractive appearance, and would not require tools for installation thereof. The present invention fulfills these needs and provides further related advantages.

SUMMARY OF THE INVENTION

The instant invention teaches a new and useful multi-functional sun shielding device for use in automobiles and other vehicles. One problem with the conventional sun shields in present automobiles is that even with both the left and right visors placed in the down position, there is a space formed between them which is not blocked, and cannot be blocked by the built-in visor equipment since they do not reach that area of the windshield. The present invention is designed to correct this problem and to act as a shade device for other portions of the windshield or other windows of the vehicle. The main objective of the present invention is to provide a sun shielding or blocking device which is easily placed at any position on the window glass of a vehicle. Further objectives include providing a pocket and other open cavities within the device for holding articles of use to the occupants of the vehicle. The foregoing objectives are achieved by the present invention through the use of materials having special characteristics and through the use of size and shape to unique advantage.

BRIEF DESCRIPTION OF THE DRAWINGS

The accompanying drawings illustrate the invention. In such drawings.

DETAILED DESCRIPTION OF THE PREFERRED EMBODIMENT

Figure 1:
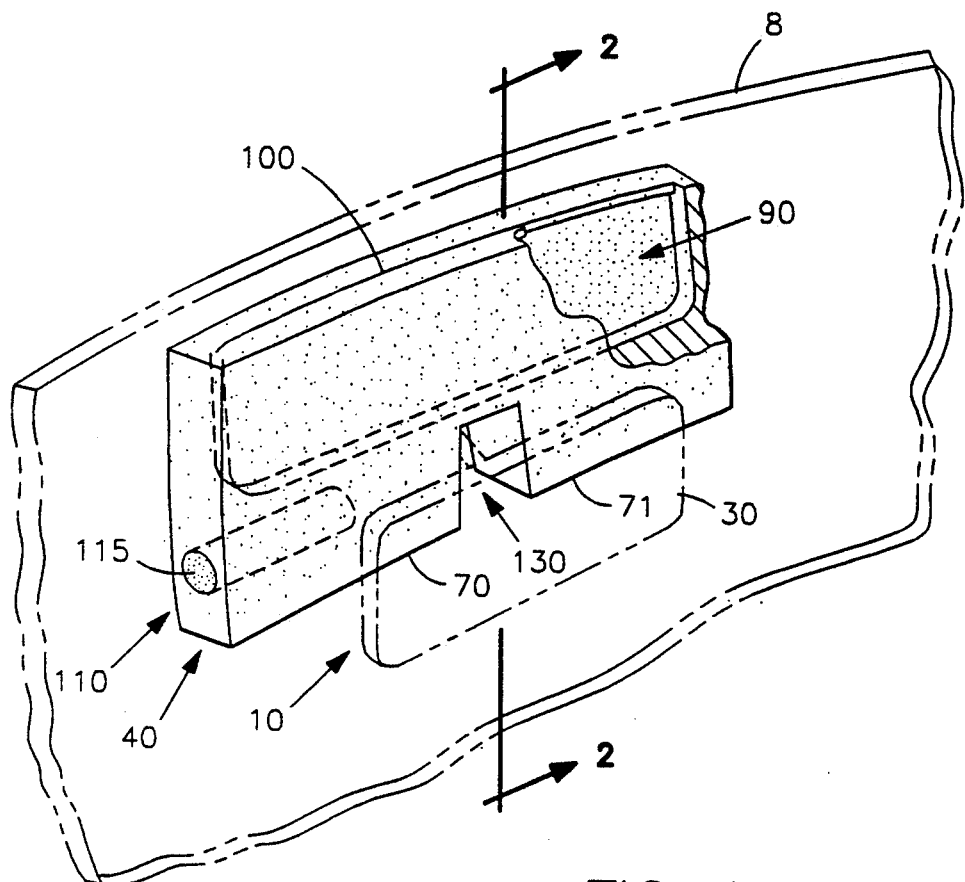
FIG. 1 is a perspective view of the invention, illustrating a sun shielding device positioned between a windshield and, in phantom outline, a rear view mirror.
Figure 3:
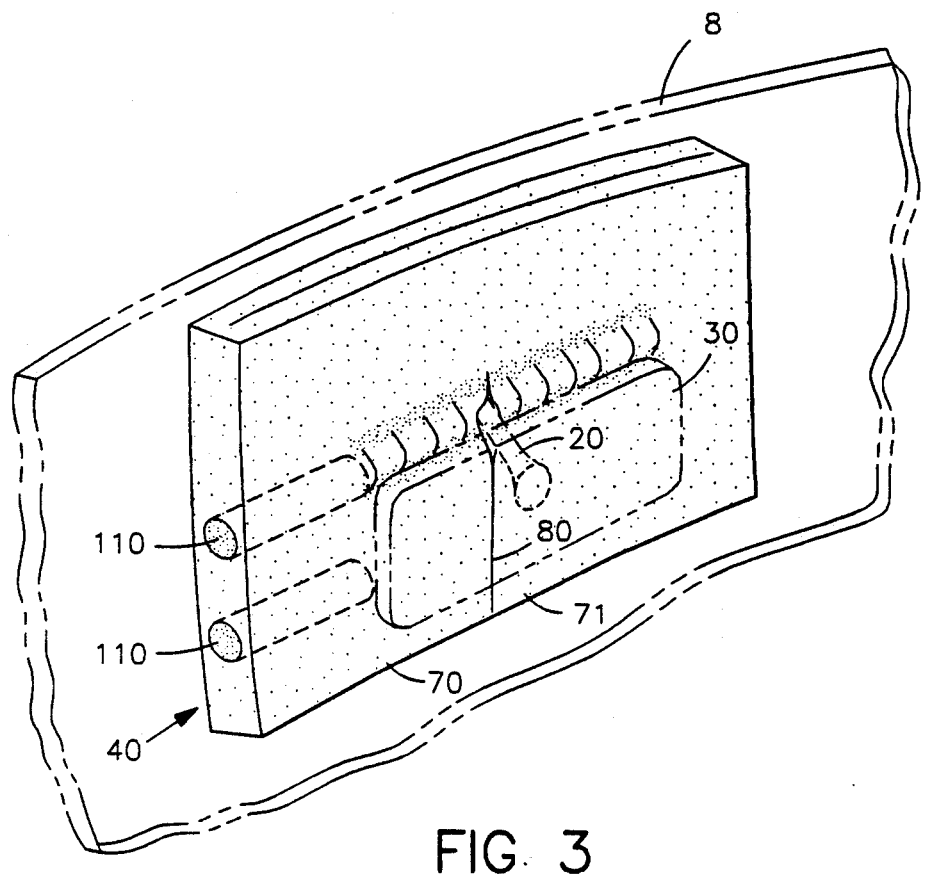
FIG. 3 is a perspective view of the invention, illustrating an embodiment wherein the shielding device is attached to a support arm of the rear view mirror.

As shown in FIGS. 1 and 3, a sun shielding device for a windshield 8 of a vehicle cooperates with a rear view mirror assembly so that the shielding device may be fixed to the windshield for blocking the suns rays. The typical mirror assembly for most motor vehicles has a support arm 20 extending away from the windshield 8 for supporting a mirror 30. The instant device comprises a block 40 of compliant and resilient material such as a foam rubber or other bendable and compressible material which has the resilient capacity to resume its original shape after being deformed, and which, upon deformation, builds an internal stress which attempts to move the deformed portions back into their original shape. The block 40 has a pair of spaced apart surfaces 50 defining a front and a back of the block 40 and which generally define the overall extent and shape of the block 40, the surfaces being joined by a peripheral edge 60 defining a thickness "t" of the block 40. The block 40 may be formed in a generally rectangular shape, or may be round or oval, etc. In one embodiment, FIGS. 3 and 4, a portion of the block is separated into two abutting sections 70, 71 defining a first slit 80 between the sections 70, 71, the slit 80 adapted for engaging the support arm 20 when the support arm 20 is forced into the slit 80, compliant compressive forces developed within the block 40 applying a clamping action upon the support arm to hold the block 40 thereon in a position to shade the sun's rays incident on the windshield 8.

The block 40 may further include a first empty space 90 within the block 40 as a pocket, the space being interconnected with and accessible from the peripheral edge 60 by a second slit 100. The pocket may be used for storing articles within the block 40 such as sunglasses or other articles used by a vehicle operator. The second slit 100 forms a closure to the pocket, preferably along the up facing portion of the edge 60. Alternate closures for the opening to the pocket may include, a flap, a zipper, a set of snaps and so on. Additional cavities or spaces 110 may be formed in the block 40 for receiving a variety of desired articles for holding the articles in a place and a position convenient to the driver or passengers in the vehicle. Such spaces 110 may be formed so that they extend to the peripheral edge 60 so that articles may be pushed into them directly. Such articles as a pen or pencil, a deodorant stick, a cigarette, a lipstick or other items may be placed into spaces 110 formed within the block, the spaces 110 having a well designed shape such that with the articles placed within the block 40, each of the articles is held therein by the compressive forces exerted by the side walls 115 of the spaces 110 upon the items and by friction forces. To assure that friction forces are as high as possible the materials used to construct the block should have a coefficient of friction which is as high as possible. The friction forces may be increased by forming the inside walls of the spaces or cavities formed in the block as roughened or otherwise modified surfaces.

Figure 2:
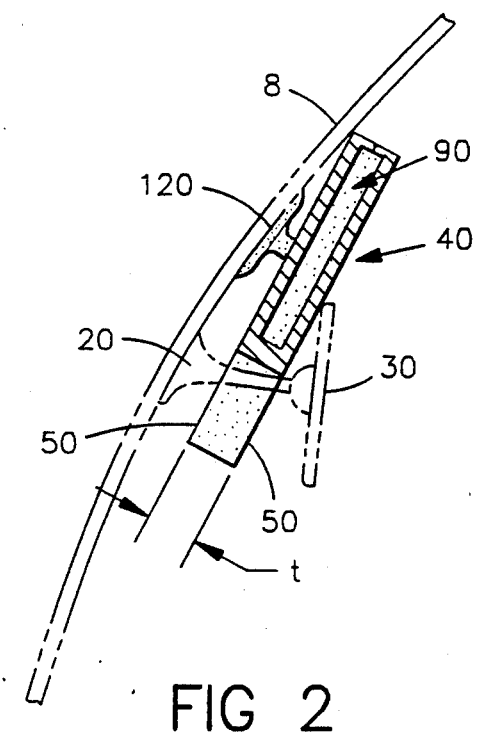
FIG. 2 is a cross-sectional view of the invention, taken generally along lines 2—2 of FIG. 1, illustrating a first empty space of the device and a suction cup attached to the windshield.

Several means for holding the block 40 in place in conjunction with the mirror assembly 20, 30 are taught herein. In FIGS. 1 and 2, the block 40 is held to the windshield by a suction cup 120 or other suction device. The suction cup 120 may be a separate attached device used in conjunction with the block 40, or may be a series of depressions (not shown) formed in the block's surfaces 50 which when pressed against the windshield causes suction action to be generated to hold the block 40 against the windshield 8. The block 40 tends to stay in position since it rides upon the support arm 20 of the mirror assembly while the sections 70, 71 are positioned astride the support arm 20.

Figure 4:
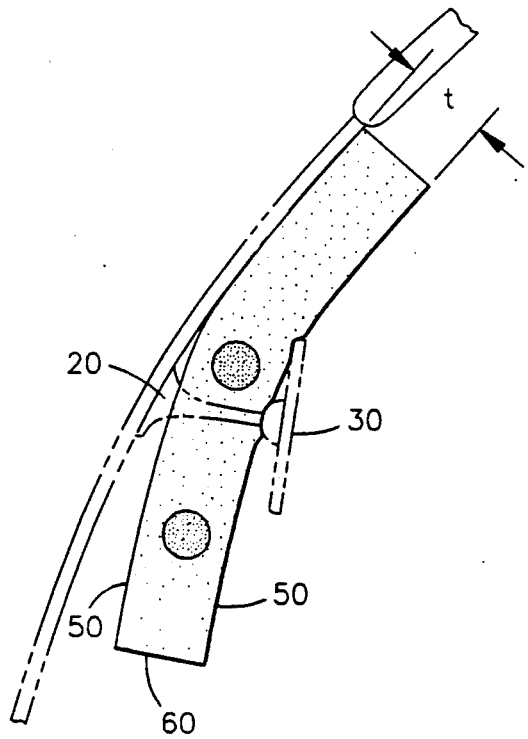
FIG. 4 is a right side elevational view of the invention, illustrating the device as wedged between the windshield and the rear view mirror, and further illustrating additional storage spaces along one side.

In an alternate embodiment shown in FIGS. 3 and 4, the block is formed with a width sufficient so that the block, when wedged between the windshield and the mirror is held there by compressive forces between the latter. The slit 80 may act to hold the block in place by forming a clamping action on the mirror support arm as shown in FIG. 3. When the block is held by suction action against the windshield, the block may be placed at any position of the windshield and is held without the aid of the support arm 20 or mirror 30.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A sun shielding device for a windshield of a vehicle, the device cooperating with a rear view mirror assembly support arm extending away from the windshield for supporting a mirror, the device comprising a block of compliant material having a pair of spaced apart surfaces defining an overall extent of the block, the surfaces being joined by a peripheral edge defining a thickness of the block, a portion of the block being separated into two abutting sections defining a first slit therebetween, the slit adapted for engaging the support arm when the support arm is forced into the slit, compliant compressive forces developed within the block applying a clamping action upon the support arm to hold the block in place thereon in a position to block the sun's rays incident on the windshield and further including a first empty space within the block, the space being interconnected with the peripheral edge by a second slit in same, the slit providing access to the space for storing articles within the block, while providing a means for closure of the space.

2. The sun shielding device of claim 1 further including at least one second empty space within the block, each of the at least one second space extending to the peripheral edge for accommodating an elongate object inserted therein for storage of same in a convenient position for accessibility.

3. A sun shielding device for a windshield of a vehicle, the device cooperating with a rear view mirror assembly support arm extending away from the windshield for supporting a mirror, the device comprising a block of compliant material having a pair of spaced apart surfaces defining an overall extend of the block, the surfaces being joined by a peripheral edge defining a thickness of the block, a portion of the block being separated into two sections defining a slot therebetween, the slot adapted for fitting around the support arm, the thickness of the block being of a magnitude such that with the block forced between the windshield and the mirror, compliant compressive forces developed within the block apply a wedging action to hold the block between the windshield and the mirror in a position to block the sun's rays incident on the windshield.

4. The sun shielding device of claim 3 further including a first empty space within the block, the space being interconnected with the peripheral edge by a slit in same, the slit providing access to the space for storing articles within the block, while providing a means for closure of the space.

5. The sun shielding device of claim 4 further including at least one second empty space within the block, each of the at least one second space extending to the peripheral edge for accommodating an elongate object inserted therein for storage of same in a convenient position for accessibility.

6. A sunshielding device for a windshield of a vehicle, the device cooperating with a rear view mirror assembly support arm extending away from the windshield for supporting a mirror, the device comprising a block of compliant material having a pair of spaced apart surfaces defining an overall extend of the block, the surfaces being joined by a peripheral edge defining a thickness of the block, a portion of the block being separated into two non-abutting sections defining a slot therebetween, the slot adapted for fitting around the support arm, and further including a suction means attached to one of the spaced apart surfaces, the suction means holding the block in a preferred position against the windshield in a position to block the sun's rays incident on the windshield, and further including a first empty space within the block, the space being interconnected with the peripheral edge by a slit in same, the slit providing access to the space for storing articles within the block, while providing a means for closure of the space.

* * * * *